United States Patent [19]
Akasaka et al.

[11] Patent Number: 5,471,407
[45] Date of Patent: Nov. 28, 1995

[54] METHOD OF DETECTING LONGITUDINAL DIRECTION OF INSPECTION OBJECT AND IDENTIFYING CONFIGURATION OF THE SAME

[75] Inventors: Toru Akasaka, Chikushino; Taisuke Mori, Fukuoka, both of Japan

[73] Assignee: Matsushita Electric Industrial Co., Ltd., Osaka, Japan

[21] Appl. No.: 39,670

[22] Filed: Mar. 30, 1993

[30] Foreign Application Priority Data

Mar. 31, 1992 [JP] Japan .................................. 4-076686

[51] Int. Cl.$^6$ .................................................. G06K 9/52
[52] U.S. Cl. ............................ 364/559; 382/145; 382/199
[58] Field of Search ................................ 364/516, 559, 364/474.34; 382/8, 16, 25, 28, 48

[56] References Cited

U.S. PATENT DOCUMENTS 4,845,764  7/1989  Ueda ............................................ 382/8

Primary Examiner—Emanuel T. Voeltz
Assistant Examiner—Edward Pipala
Attorney, Agent, or Firm—Lowe, Price, LeBlanc & Becker

[57] ABSTRACT

A method of detecting a longitudinal direction of an inspection object and identifying a configuration of the same. A camera takes an image of an inspection object to obtain a border line of the image. A plurality of vectors having substantially the same absolute value and arrayed continuously on the border line are set, and a distribution of inclinations of all the vectors are obtained. Then, a longitudinal direction of the inspection object is detected on the basis of thus obtained distribution of vector inclination. Accordingly, the detection of a longitudinal direction can be performed accurately about the inspection object regardless of the number of corners on the border line. Furthermore, the detection will be accurately done even if the image includes a noise such as a nozzle.

11 Claims, 8 Drawing Sheets

METHOD OF DETECTING LONGITUDINAL DIRECTION OF INSPECTION OBJECT AND IDENTIFYING CONFIGURATION OF THE SAME

BACKGROUND OF THE INVENTION

1. Field of The Invention

The present invention relates to a method of detecting a longitudinal direction of an inspection object such as an electronic component and identifying a configuration of the same.

2. Description of The Prior Art

A mounting apparatus installs electronic components on a substrate, on the upper surface of which a printed circuit pattern is formed. A suction nozzle holds an electronic component. At an observation position, a camera measures or detects an absorption point of the suction nozzle to the electronic component, a direction of the electronic component, an absorption angle on a horizontal plane etc. An adjustment is carried out on the basis of these measured or detected data to correct a shift distance (shift stroke) of the suction nozzle and a rotational angle of the suction nozzle about its rotational axis. Thereafter, the electronic component is conveyed to and installed on a predetermined position of the substrate. This installation operation cannot be accomplished without detecting a longitudinal direction of the electronic component.

A conventional method of detecting a longitudinal direction of an electronic component was carried out by chiefly detecting each corner of the electronic component. By knowing all of corners, the longitudinal direction of the electronic component can be identified. The suction nozzle, however, tended to cause an error in such a conventional detection method. Because, the absorption point of the suction nozzle is not stable on the electronic component. It may offset widely toward a corner of the electronic component. The camera, observing these suction nozzle and electronic component, will produce an image of the electronic component superposed by an image of the suction nozzle at the corner thereof. In such a case, the detecting operation will fail to detect this superposed corner, resulting in an unaccomplished detection of the longitudinal direction of the electronic component.

Furthermore, if a rectangular electronic component has a plurality of leads laterally extending from both sides of the rectangular electronic component as shown in FIG. 7B, edges of these leads will cause confusion in the detection of the longitudinal direction because more than 4 edges will be detected by the camera. This will make it difficult to identify 4 corners of the rectangular electronic component. It is difficult to judge whether each edge belongs to the electronic component or to the lead.

SUMMARY OF THE INVENTION

Accordingly, the present invention has a purpose, in view of above-described problems or disadvantages, to provide a method of accurately detecting a longitudinal direction of an inspection object such as an electronic component and accurately identifying a complicated configuration of the same.

In order to accomplish above purposes, a first aspect of the present invention provides a method of detecting a longitudinal direction of an inspection object comprising:

a first step of taking an image of an inspection object by a camera, and obtaining a border line of said image;

a second step of setting a plurality of vectors having substantially the same absolute value and arrayed continuously on said border line, and obtaining a distribution of inclinations of said vectors; and a third step of detecting a longitudinal direction of the inspection object on the basis of said distribution.

Furthermore, a second aspect of the present invention provides a method of identifying a configuration of an inspection object comprising:

a first step of taking an image of an inspection object having a predetermined number of protrusions by a camera, and obtaining a border line of said image;

a second step of detecting a plurality of protrusion-like points from curvature change of said border line;

a third step of setting a plurality of vectors having substantially the same absolute value and arrayed continuously on said border line, and obtaining a distribution of inclinations of said vectors;

a fourth step of detecting a longitudinal direction of the inspection object on the basis of said distribution; and a fifth step of obtaining a plurality of groups each consisting of the same number of protrusion-like points as the actual protrusions of said inspection object, and identifying the position of the protrusion on the basis of said longitudinal direction detected in the fourth step.

The above and other objects, features and advantages of the present invention will become more apparent from the following detailed description which is to be read in conjunction with the accompanying drawings.

BRIEF DESCRIPTION OF THE DRAWINGS

FIGS. 111A, 11B, 11C and 11D respectively show how the method of identifying the configuration of the electronic component is carried out in accordance with the present invention.

DETAILED DESCRIPTION OF THE PREFERRED EMBODIMENTS

Hereinafter, with reference to accompanying drawings, preferred embodiments of the present invention will be explained in detail.

Figure 1:
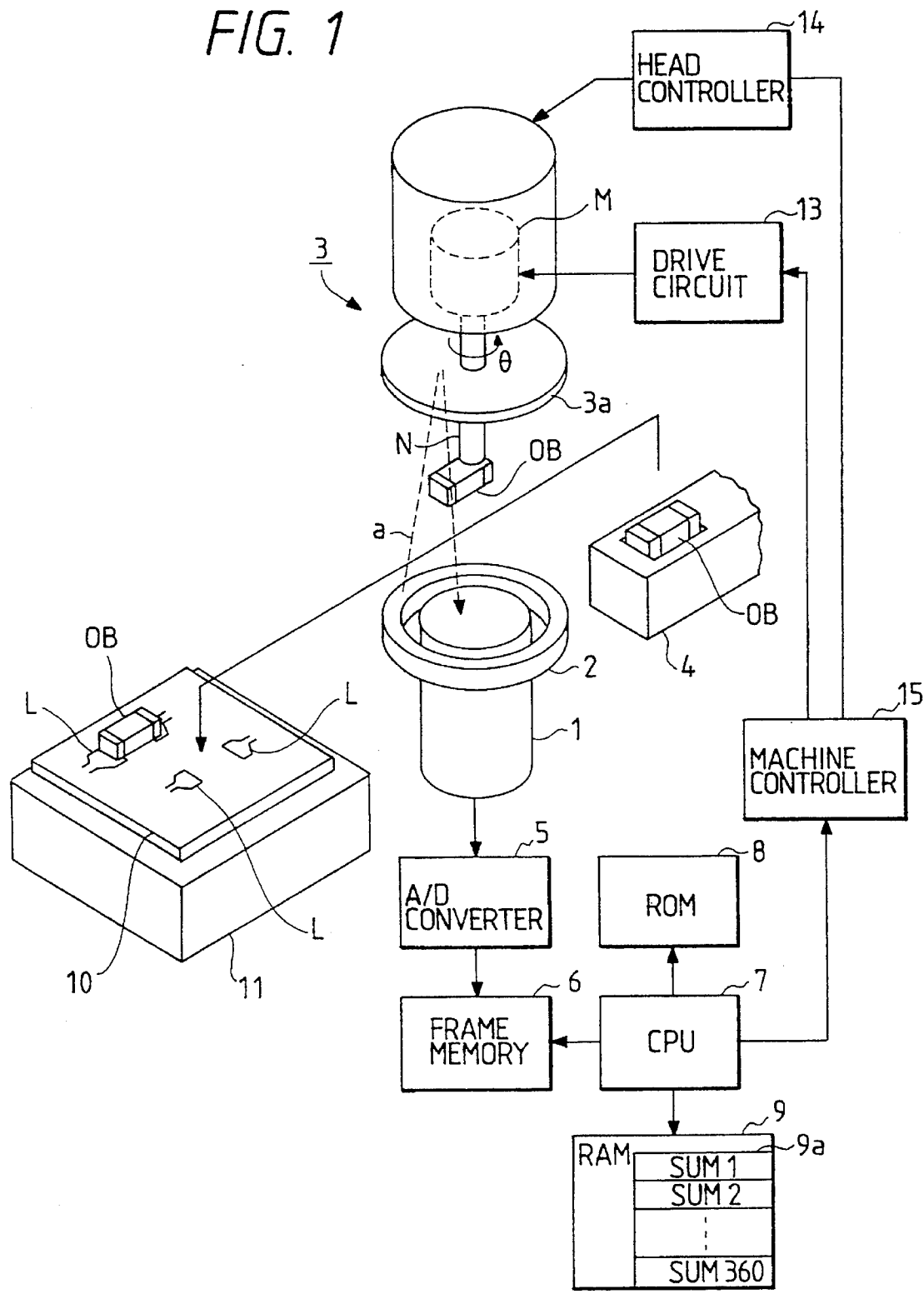
FIG. 1 is a schematic view showing a mounting apparatus for an electronic component, to which a method of detecting a longitudinal direction of the electronic component is applied in accordance with the present invention.

FIG. 1 is one embodiment of a mounting apparatus for electronic components, to which the method of detecting a longitudinal direction of an electronic component is applied in accordance with the present invention.

In FIG. 1, a reference numeral 3 represents a head for transporting an inspection object OB. A head controller 14 controls this head 3 to shift in horizontal and vertical directions. A reference symbol N represents a suction nozzle having a vertically extending cylindrical shape. This suction nozzle N, communicating with a suction device (not shown), holds the inspection object OB such as an electronic component. The head S accommodates a motor M therein. An output of the motor M is connected to the nozzle N, so that the nozzle N can rotate about its central axis along a direction 9 in response to the rotation of the motor M. A reference numeral 3a represents a disk-shaped reflection plate, which is disposed coaxially with the nozzle N.

A reference numeral 1 represents a camera, and a reference numeral 2 represents a light source. A beam "a", emitted from the light source 2, is reflected back at the reflection plate 3a and received by the camera 1. That is, the camera 1 picks up a silhouette of the electronic component OB located just under the reflection plate 3a. The camera 1 is a CCD camera, which is a solid image pick-up element. A reference numeral 4 represents a feeder of parts, which loads an electronic component OB thereon to supply it to the head 3.

A reference numeral 10 represents a substrate, on the upper surface of which a circuit pattern L is printed. A reference numeral 11 represents a substrate holding table, on which the substrate 10 is mounted.

A reference numeral 5 represents an A/D converter, which transforms an image signal generated from the camera 1 into a digital signal. A reference numeral 6 represents a frame memory, which stores digital signals fed from the A/D converter 5. A reference numeral 7 represents a CPU, which executes various calculations and processing in compliance with a program memorized in a ROM 8. A reference numeral 9 represents a RAM, which stores calculation or processing data temporarily. This RAM 9 has an inclination storage region 9a, which stores data relating to the distribution of inclinations of vectors which will be described later.

A reference numeral 13 represents a drive circuit, which drives the motor M. A reference numeral 15 represents a machine controller, which controls the head controller 14 and the drive circuit 13 in response to a command signal supplied from the CPU 7.

The mounting apparatus for electronic components operates in the following manner. First of all, the camera 1 observes the electronic component OB. On the basis of the signal of the camera 1, the CPU 7 calculates the position of the electronic component OB. Next, the machine controller 15 controls the drive circuit 13 and the head controller 14 on the basis of the calculation result obtained in the CPU 7, so as to install the electronic component OB on a predetermined position of the substrate 10.

The inclination storage region 9a includes frequency memories SUM1~SUM360, which uniformly divide 360 degrees of all directions into 360 sections each corresponding to an angle of 1 degree. Accordingly, each frequency memory in the inclination storage region 9a stores the number of vectors having the same inclination angle corresponding to that frequency memory.

Next, the method of detecting a longitudinal direction of the electronic component in accordance with the present invention will be explained with reference to FIG. 2.

First of all in a step S1, the camera 1 takes in an image of the electronic component OB (i.e. an inspection object) within a visual field V thereof. The A/D converter 5 transforms the image signal picked-up by the camera 1 into a digital signal and stores it in the frame memory 6.

Figure 3A:
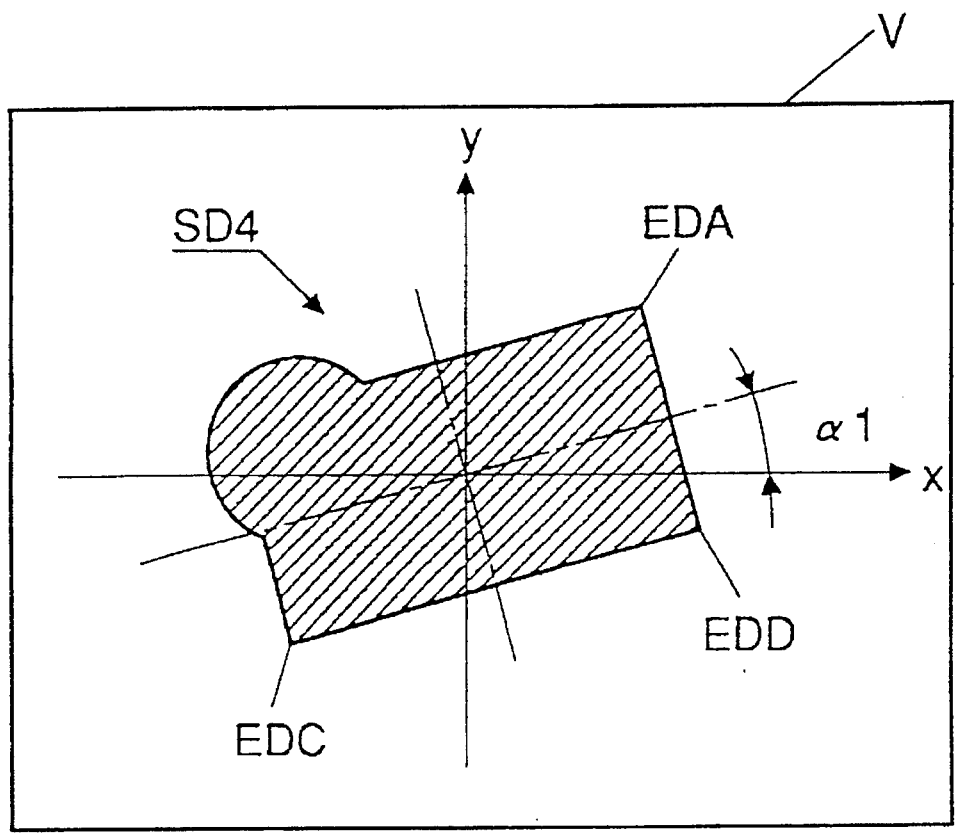
FIG. 3A is a view showing one example of a camera image detected in the method of detecting the longitudinal direction of the electronic component in accordance with the present invention.
Figure 3B:
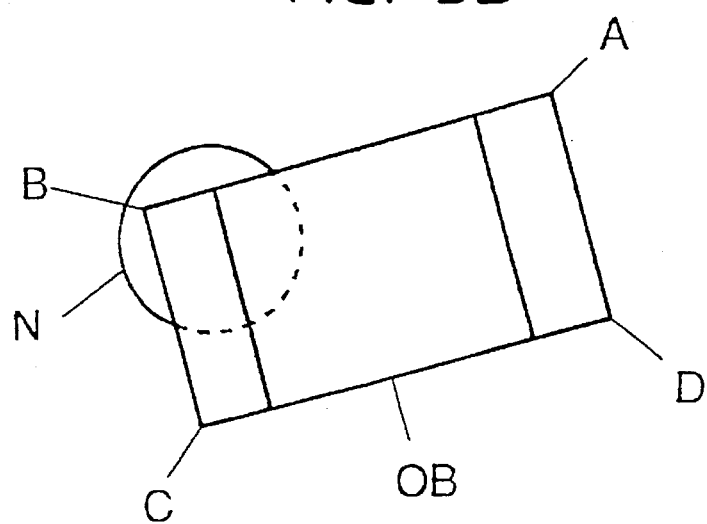
FIG. 3B is a view illustrating an absorption position of a suction nozzle to the electronic component in accordance with the method of detecting the longitudinal direction of the electronic component of the present invention.

FIG. 3A shows a detailed image (silhouette) SD4 which is picked-up by the camera 1. The image SD4 includes a noise— i.e. an image of the nozzle N superposed at upper left corner of the rectangular electronic component in the drawing. Such a silhouette SD4 is obtained when the nozzle N offsets from the center of the electronic component OB and holds one corner B of the electronic component OB as shown in FIG. 3B. In such a case, the nozzle N conceals a characteristic shape of the corner B from the silhouette SD4.

On the other hand, each characteristic shape of other corners A, C, and D clearly appears on the silhouette SD4 of the electronic component OB. (Refer to points EDA, EDC, EDD in FIG. 3A)

Figure 4:
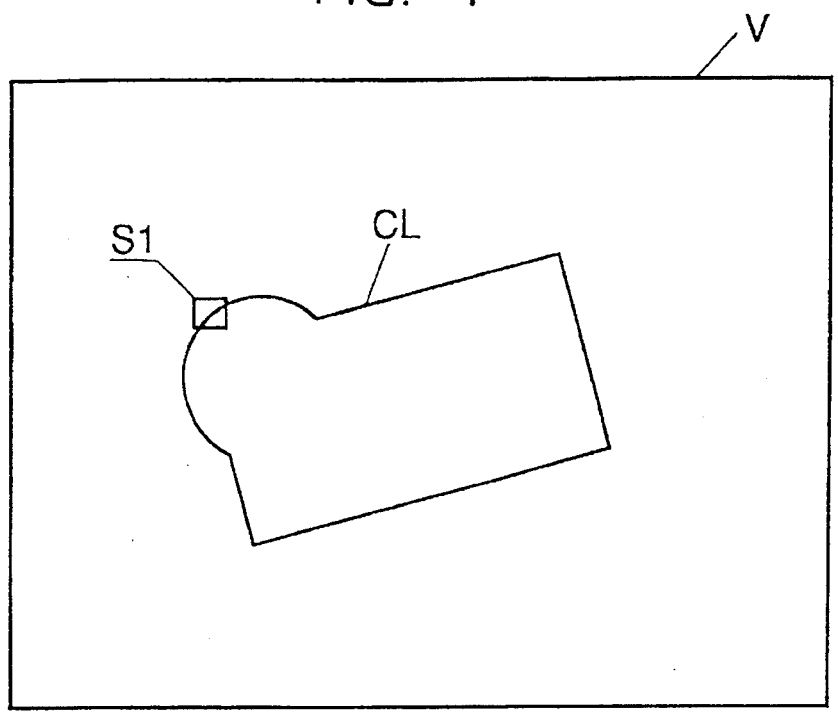
FIG. 4 is a view illustrating an image processing in accordance with the method of detecting the longitudinal direction of the electronic component of the present invention.

Next in a step S2, a border line CL of the silhouette SD4 is detected as shown in FIG. 4.

The U.S. Pat. No. 4,845,764, especially FIG. 13, discloses a method of detecting a border line of a silhouette. According to this method, first of all, a camera takes in an image of an inspection object. One point on the border line of the inspection object is specified as a beginning point. About this specified point, the three-by-three (3 by 3) mask calculation is carried out and its result is memorized to obtain a connecting direction. This connecting direction is identical with a direction from the specified point to a next adjacent point on the border line.

Next the three-by-three (3 by 3) mask calculation is carried out about the thus obtained adjacent point in the same manner as for the above specified beginning point. By repeating the same procedure, the connecting direction is obtained about all the points on the border line. As this processing is well known to one who has ordinary knowledge in the field of image processing technology, its detailed explanation is omitted here.

Figure 5:
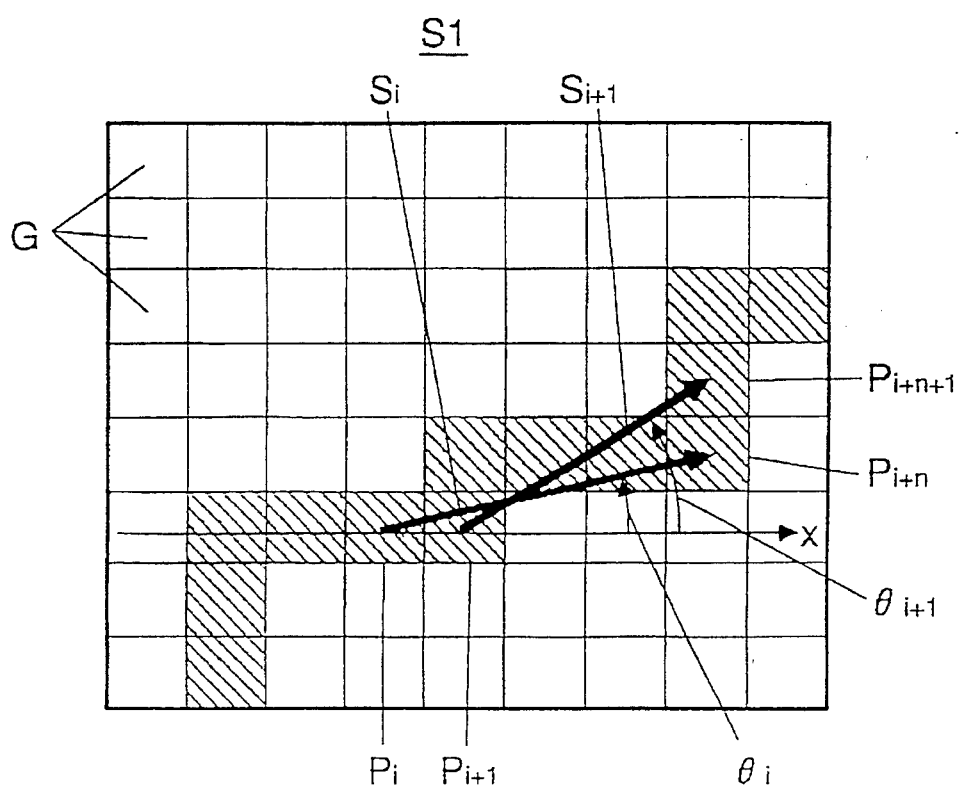
FIG. 5 is a view illustrating a processing obtaining a border line of an image in accordance with the method of detecting the longitudinal direction of the electronic component of the present invention.

FIG. 5 shows an enlarged view of a portion S1 shown in FIG. 4. When enlarged, the border line CL is expressed as an assembly of connected picture elements G. The RAM 9 memorizes respective coordinate data of picture elements $(P_0, P_1, P_2, ---, P_i, P_{i+1}, ---, P_{i+n}, P_{i+n+1}, ---P_k)$ consisting of the border line CL.

Next, a step S3 obtains vectors connecting optional two points on the border line CL on the basis of their coordinate data and, thereafter, obtains a distribution of inclinations of obtained vectors.

Figure 6:
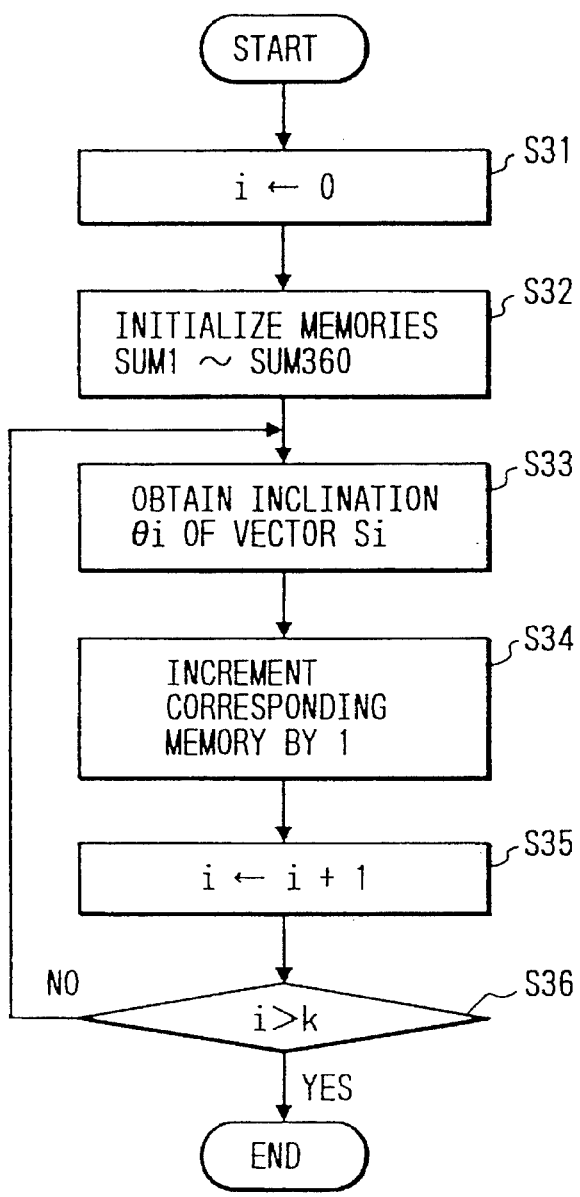
FIG. 6 is a flowchart showing how the distribution of detected inclinations is obtained in accordance with the method of detecting the longitudinal direction of the electronic component of the present invention.

FIG. 6 is a flowchart showing how the inclination distribution is obtained. According to this flowchart, a counter "i" is reset to "0" in a step S31 and frequency memories SUM1~SUM360 are initialized in a step S32. Subsequently, an inclination $\Theta_i$ of a vector $S_i$ is obtained in a step S33.

Here, a method of obtaining the vector $S_i$ will be explained with reference to FIG. 5. A picture element $P_i$ is specified as a starting point on the border line CL. Next, a picture element $P_{i+n}$, n picture elements shifted from the picture element $P_i$ along the border line CL, is specified as an ending point. The vector $S_i$ is obtained by connecting these picture elements $P_i$ and $P_{i+1}$. If the shift number "n" is 5, the vector $S_i$ is obtained as shown in FIG. 5. Then, an inclination $\Theta_i$ of this vector $S_i$ is calculated. An inclination angle $\Theta$ is measured from x-axis in a counterclockwise direction.

Now, let x-axis and y-axis values of the picture element $P_i$ be $x(P_i)$ and $y(P_i)$. In the same way, let x-axis and y-axis values of the picture element $P_{i+n}$ be $x(P_{i+n})$ and $y(P_{i+n})$. The inclination $\Theta_i$ of the vector $S_i$ is expressed as follows.

i) $\Theta_i=\tan^{-1}\{y(P_{i+n})-y(P_i)\}/\{x(P_{i+n})-x(P_i)\}$ Wherein, $y(P_{i+n}) \geq y(P_i)\}$, $x(P_{i+n}) \geq x(P_i)$ ii) $\Theta_i=\pi+\tan^{-1}\{y(P_{i+n})-y(P_i)\}/\{x(P_{i+n})-x(P_i)\}$ Wherein, $x(P_{i+n})<x(P_i)$ iii) $\Theta_i=2\pi+\tan^{-1}\{y(P_{i+n})-y(P_i)\}/\{x(P_{i+n})-x(P_i)\}$ Wherein, $y(P_{i+n})<y(P_i)\}$, $x(P_{i+n}) \geq x(P_i)$ If the inclination angle $\Theta_i$ of the vector $S_i$ is obtained, a frequency memory corresponding to this angle $\Theta_i$ increases its value by 1, in a step S34.

Subsequently, a step S35 renews a value "i" to "i+1" and a step S36 judges whether or not the value "i" is larger than a constant value "k". Here, the constant "k" is the number of all the picture elements consisting of the border line CL. If the judgement in the step S38 indicates "i" is not larger than "k", the procedure through step S33 to step S38 repeats in the same manner.

Namely, another vector $S_{i+1}$, whose starting and ending points are shifted by one picture element from the vector $S_i$, is obtained along the border line CL. In this manner, vectors having substantially the same absolute value are obtained one by one along the border line CL. An inclination $\Theta_{i+1}$ of the vector $S_{i+1}$, having a starting point $P_{i+1}$ and an ending point $P_{i+n+1}$, is obtained at the step S33. Thereafter, a frequency memory corresponding to thus obtained inclination $\Theta_{i+1}$ increases its value by 1. This procedure repeats in the same manner until the vector having substantially the same absolute value is obtained with respect to all the picture elements consisting of the border line CL (i.e. until the judgement in the step S36 turns to YES).

That is to say, by shifting the position of the picture element $P_i$ and obtaining an inclination angle $\Theta_i$ of the vector $S_i$, the frequency memory corresponding to this inclination angle $\Theta_i$ renews its value one by one. As a result, all the inclinations of thus obtained vectors along the border line CL are stored in the frequency memories SUM1~SUM360, thereby obtaining a distribution of the vector inclination.

Figure 7A:
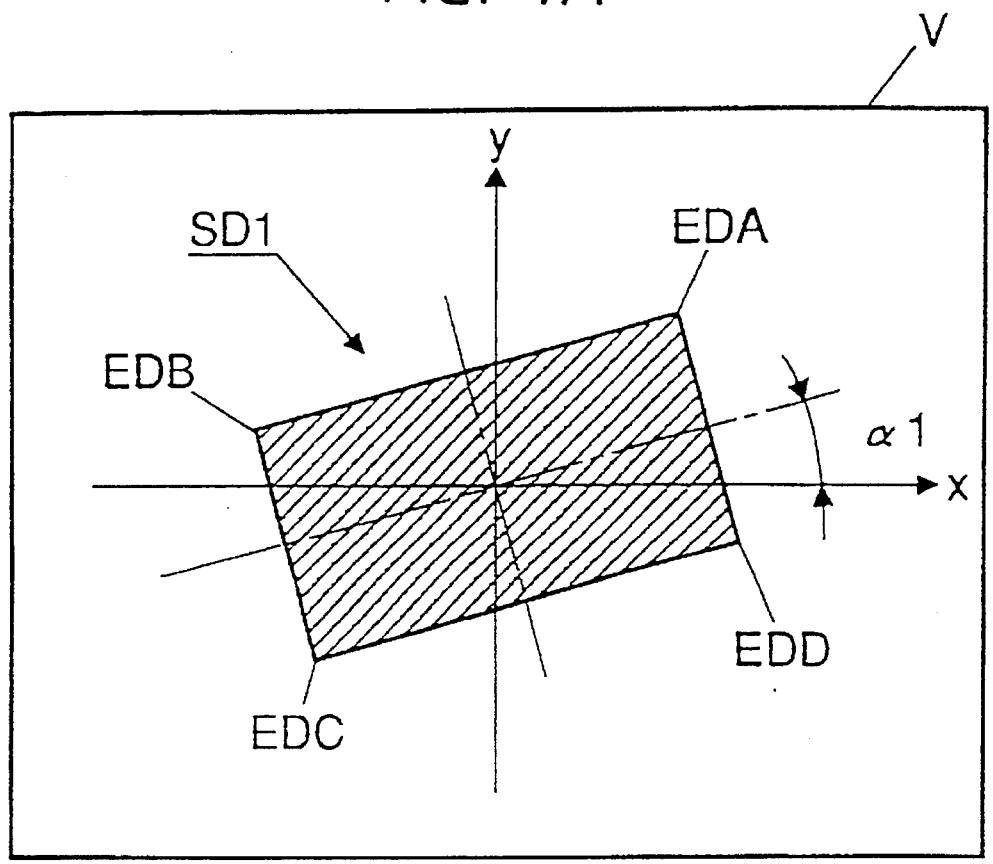
FIGS. 7A, and 7B respectively show an image of the inspection object in accordance with the method of detecting the longitudinal direction of the electronic component of the present invention.
Figure 8:
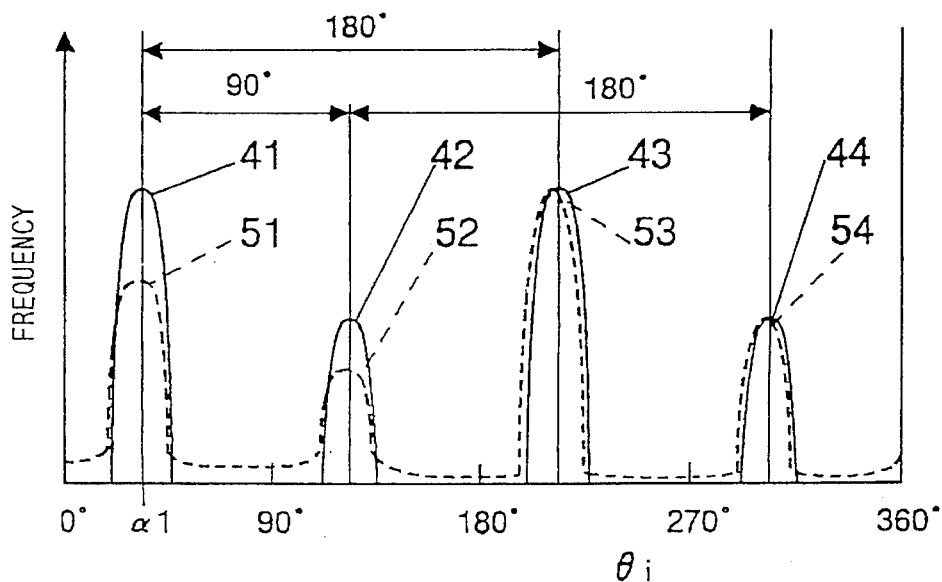
FIG. 8 is a histogram showing the distribution of detected inclinations in accordance with the method of detecting the longitudinal direction of the electronic component of the present invention.

FIG. 8 shows a histogram which specifically shows data stored in the frequency memories SUM1~SUM360. A broken line shows a distribution obtained in the case where the silhouetted SD4 of the electronic component OB includes a noise as shown in FIG. 3A. A solid line shows a distribution obtained in the case where the silhouette SD1 of the electronic component OB includes no noise as shown in FIG. 7A.

In FIG. 8, the histogram of the silhouette SD1 clearly shows four peaks 41, 42, 43, and 44. The histogram of the silhouette SD4 also shows four peaks 51, 52, 53, and 54. The peak 41 corresponds to the inclination angle $\alpha 1$ of the vectors located on the line segment (EDB, EDA) shown in FIG. 7A. The peak 43 corresponds to the inclination angle $\alpha 1+180°$ of the vectors located on the line segment (EDD, EDC) shown in FIG. 7A.

In the same way, the peak 42 corresponds to the inclination angle $\alpha 1+90°$ of the vectors located on the line segment (EDA, EDD) shown in FIG. 7A. The peak 44 corresponds to the inclination angle $\alpha 1+270°$ of the vectors located on the line segment (EDC, EDB) shown in FIG. 7A.

As the line segments (EDB, EDA) and (EDD, EDC) are longer than the line segments (EDA, EDD) and (EDC, EDB), the number (equivalent to the frequency) of vectors located on the line segments (EDB, EDA) and (EDD, EDC) is larger than the number (equivalent to the frequency) of vectors located on the line segments (EDA, EDD) and (EDC, EDB). As a result, the peaks 41, 43 are higher than the peaks 42, 44.

As the silhouette SD1 is rectangle, peaks 41, 42, 43, and 44 are spaced from one another at an interval of 90°. If the direction of the inspection object (i.e. electronic component) OB varies, these peaks 41, 42, 43, and 44 may appear at different angles with keeping their mutual angular relationship.

It is apparent that the peaks 41 and 43 show the longitudinal direction of the inspection object.

Even if the image of the inspection object OB includes a noise as shown by SD4, four peaks 51, 52, 53, and 54 are clearly obtained on the histogram (FIG. 8), though they may have lower heights. The cause of reducing the heights of the peaks 51, 52 is the nozzle N, which superposes at an upper left corner of the inspection object OB.

The CPU 7 analyzes the data of the frequency memories SUM1~SUM360 to obtain a longitudinal direction of the inspection object. In more detail, the CPU 7 detects the frequency memories storing peaks 51, 53 and obtains a longitudinal direction on the basis of an inclination corresponding to these frequency memories.

Information relating to the position of the electronic component is supplied to the machine controller 15. The machine controller 15 controls the head controller 14 and the drive circuit 13 to correct the position of the electronic component by means of the motor M and to place it on a predetermined position of the substrate 10.

Figure 7B:
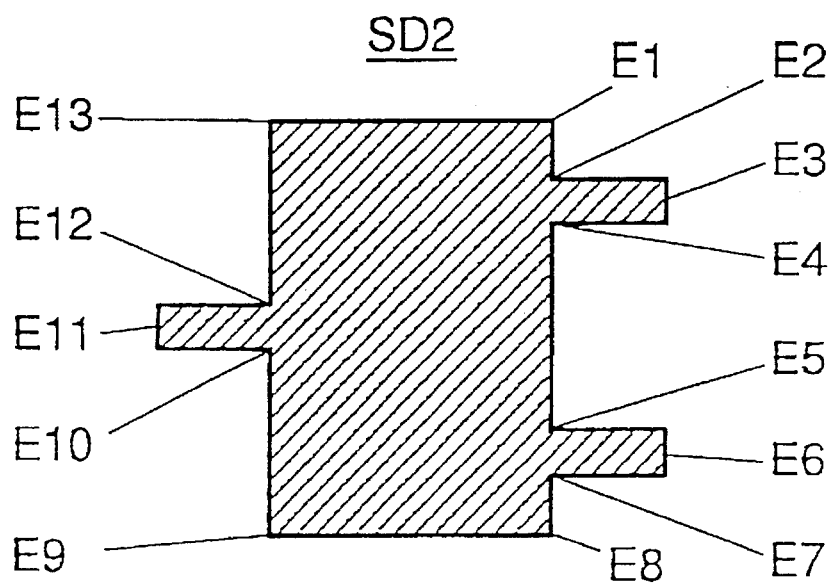

Next, a method of identifying a configuration of the inspection object will be explained with reference to FIG. 7B. FIG. 7B shows a silhouette SD2 of a mini transistor having three protrusions (pins). These three pins must be placed at predetermined positions of the printed circuit on the substrate 10; therefore it is necessary to obtain the configuration (positions) of these pins correctly.

Figure 9:
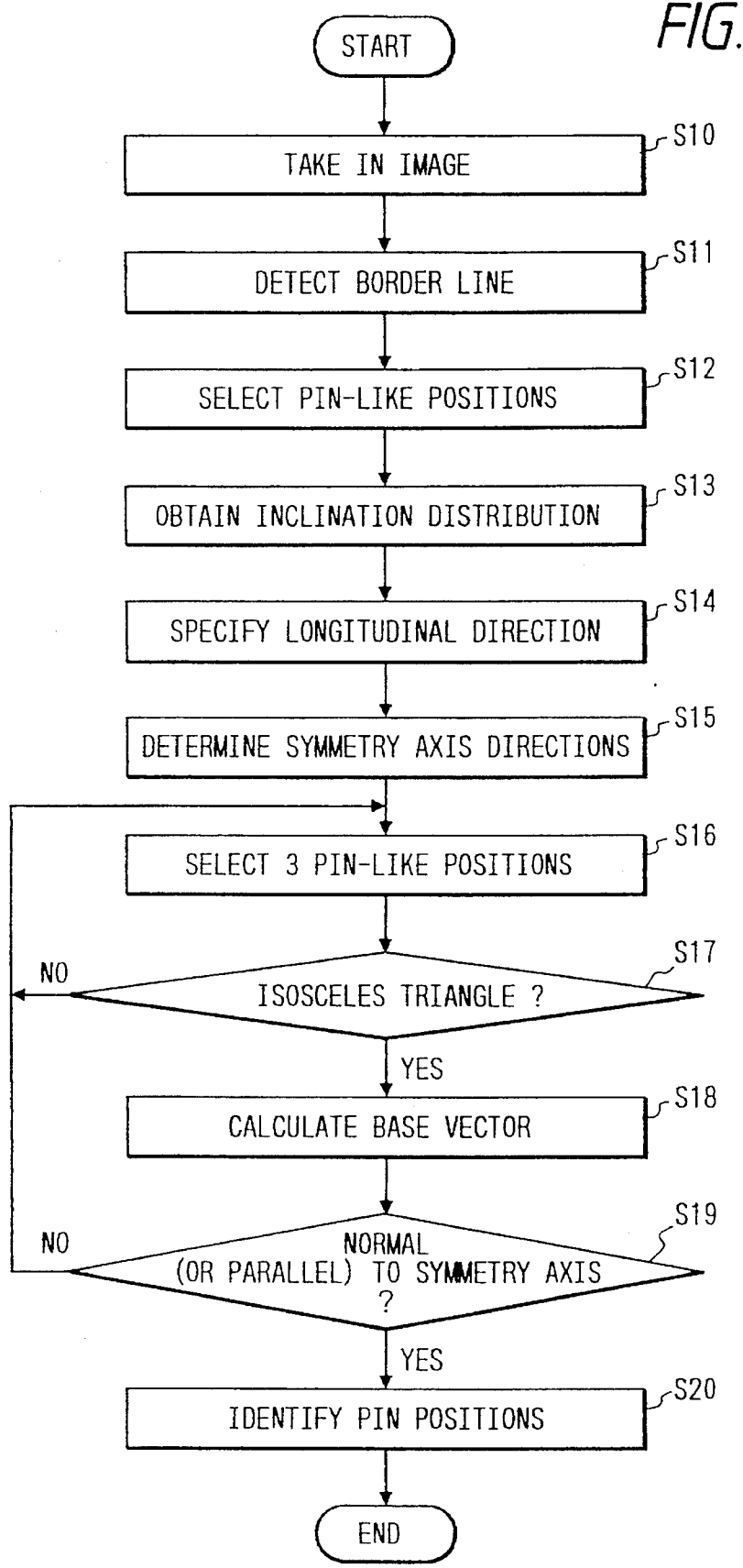
FIG. 9 is a flowchart showing a method of identifying a configuration of the electronic component in accordance with one embodiment of the present invention.
Figure 10A:
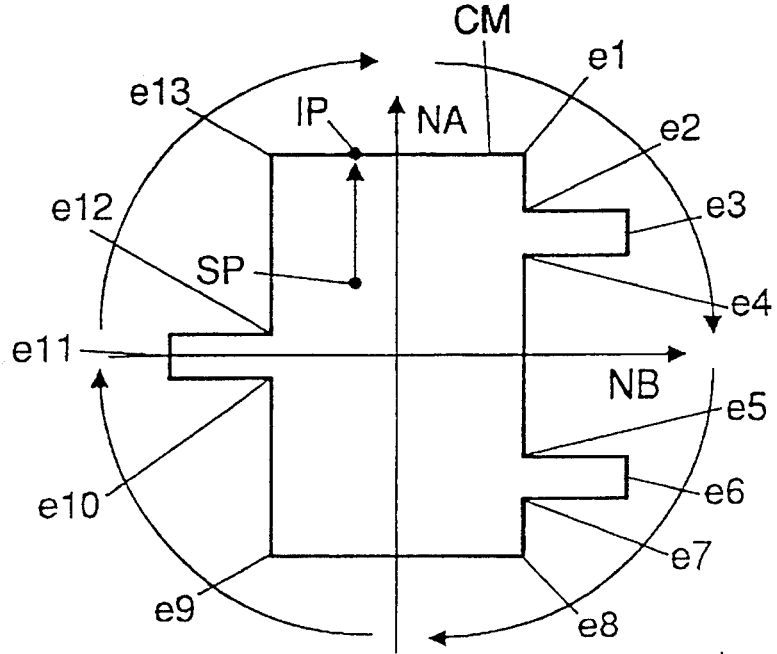
FIGS. 10A, 10B, and 10C respectively show how the method of identifying the configuration of the electronic component is carried out in accordance with the present invention.
Figure 10C:
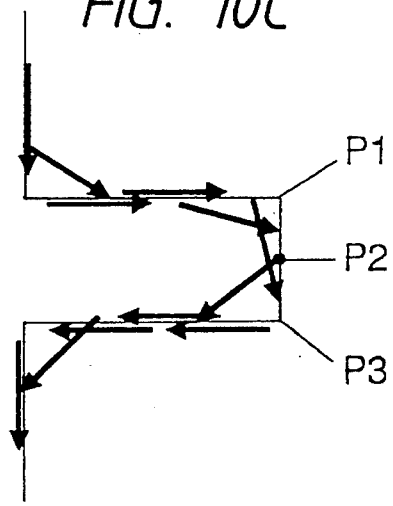
Figure 10B:
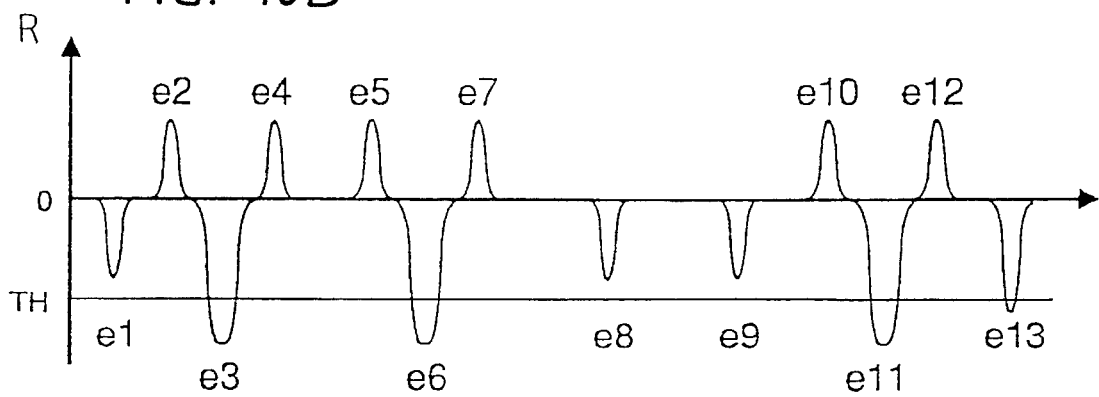

FIG. 9 is a flowchart showing the procedure of identifying the pins. FIGS. 10A, 10B, and 10C respectively shows a processing of picking up pin positions. FIGS. 11A, 11B, 11C, and 11D respectively show a processing of identifying pin positions. In FIG. 9, in steps S10 and S11, the camera 1 takes in an image of the inspection object OB and obtains a border line in the same manner as steps S1 and S2 of FIG. 2. FIG. 10A shows a border line CM obtained through the steps S10 and S11.

Next, a starting point SP is set within an area surrounded by the border line CM. Shifting a point along y-axis, an intersection point IP is obtained on the border line CM. A point moves along the border line CM so as to make one complete circle as shown by four arc-shaped arrows. During this rotation, change of curvature "R" is calculated. Here, the curvature "R" shows a change of direction of the vector locating on the border line CM.

$$R = \Theta_{i+1} - \Theta_i$$

Wherein, $\Theta_{i+1}$: an inclination of vector $S_{i+1}$ $\Theta_i$: an inclination of vector $S_i$ The U.S. Pat. No. 4,845,784 discloses in detail the method of how this curvature R is obtained.

The vector $S_i$ is obtained in the same manner as FIG. 5. FIG. 10B shows a change of curvature obtained in this manner. An ordinate axis shows a position on the border line. Peaks e1, e2, - - -, e13 correspond to characteristic points e1, e2, - - -, e13, respectively.

As the vector has a certain length (i.e. absolute value), a peak of curvature is obtained at a middle point P2 between corner points P1 and P3 not at the corner points P1 and P3, in case of a sharp protruding portion (e.g. an image of a pin).

Therefore in a step S12, a pin-like point is selected among above peak points e1, e2, - - -, e13, by comparing them with a predetermined threshold value TH. That is, the selected pin-like points have a larger absolute value than the threshold value TH in the peak of the curvature R. In FIG. 10B, points e2, e6, e11, and e13 are pin-like points. It is noted that the threshold value TH should be determined to obtain the same number of pin-like points as the actual pins. However, the number of the pin-like points may exceed the number of the actual pins. As a matter of fact, the peak e13 obtained by FIG. 10B does not correspond to the actual pin, though other peaks e3, e6, e11 represent the actual pins as shown in FIG. 10A.

In such a case, a longitudinal direction of the mini transistor is specified by use of the method of obtaining the longitudinal direction in accordance with the previously described embodiment. With reference to thus known longitudinal direction, only correct pin points are selected among excessive pin-like points.

Figure 2:
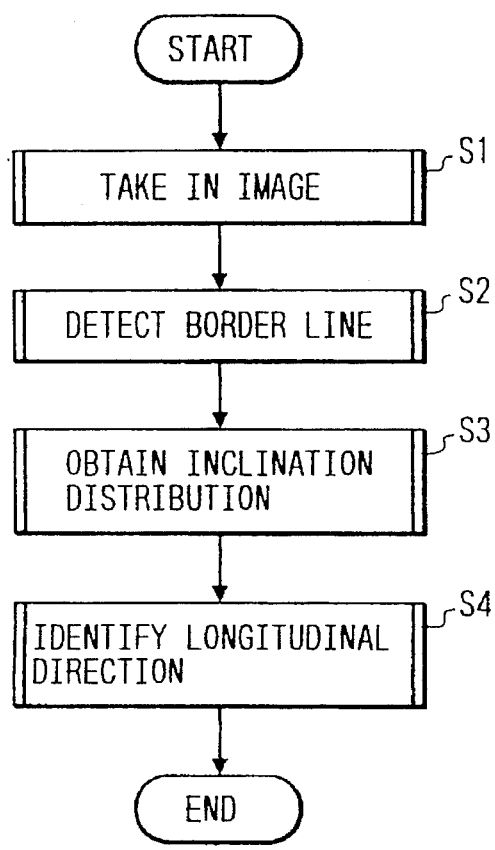
FIG. 2 is a flowchart showing a procedure for detecting a longitudinal direction of the electronic component in accordance with one embodiment of the present invention.

Namely in steps S13 and S14 of FIG. 9, a distribution of inclination is obtained on the basis of data of the border line CM and the longitudinal direction is specified by using the steps S3 and S4 of FIG. 2.

Thereafter in a step S15, this longitudinal direction and a direction normal to this longitudinal direction are specified as symmetry axis directions. FIG. 10A shows thus obtained symmetry axis directions NA (i.e. longitudinal direction) and NB (i.e. a direction normal to the longitudinal direction).

Next in a step S16, any three points are selected among pin-like points. These selected three points will form a triangle. In case of an example of FIG. 10A, four kinds of triangles will be obtained as shown in FIGS. 11A, 11B, 11C, and 11D.

Subsequently, it is judged in a step S17 whether or not the triangle is an isosceles triangle. If the triangle is not an isosceles triangle, that triangle will include a point not representing an actual pin. (See, FIGS. 11B, 11C, and 11D)

Figure 11A:
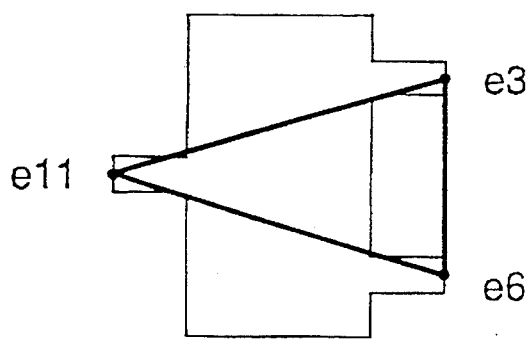
Figure 11C:
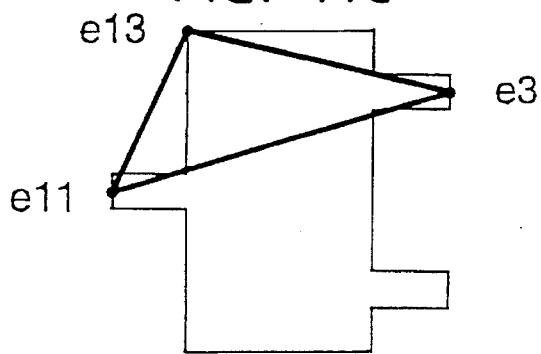
Figure 11B:
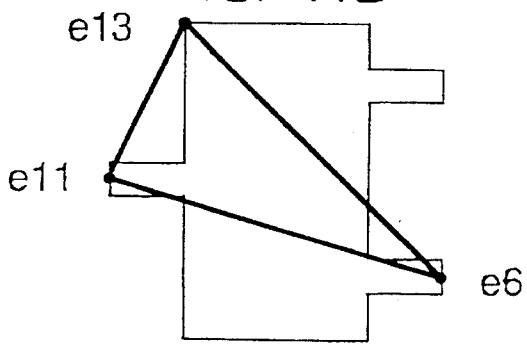
Figure 11D:
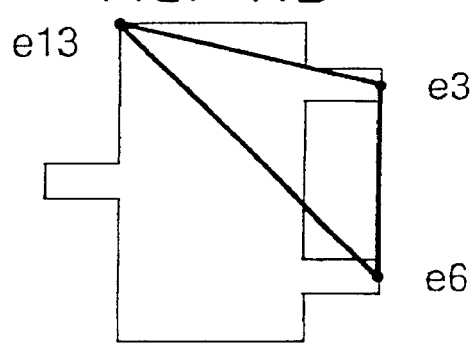

The triangles of FIGS. 11C and 11D are eliminated in this step. The triangle of FIG. 11B, however, may still remain because it resembles an isosceles triangle.

Next in a step S18, a vector representing a base of the triangle is calculated. In turn, it is judged in a step S19 whether or not thus obtained base vector is normal or parallel to the symmetry axes (NA and NB). Thus, only the one whose base is normal or parallel to the symmetry axes is chosen finally. The judgement of whether or not the base vector is normal or parallel to the symmetry axes would be easily done to one who has ordinary knowledge of mathematical field; therefore its explanation is omitted here.

In case of examples shown in FIGS. 11A and 11B, the triangle of FIG. 11B is apparently not normal or parallel to the symmetry axes. Thus, the triangle of FIG. 11B is eliminated and the triangle of FIG. 11A is finally obtained. The points e3, e6, e11 constituting apexes of the triangle of FIG. 11A will be specified as true pin positions in a final step S20.

Subsequently, the CPU 7 calculates the position and the inclination of the electronic component by taking account of these true pin positions. The machine controller 15 controls the head controller 14 and the drive circuit 13 of the motor M on the basis of the command outputted from the CPU 7, so as to correctly install the electronic component OB on the substrate 10.

In accordance with above constitution, the border line of the silhouette is obtained about the inspection object taken by the camera, and the inclination distribution of vectors is obtained about a plurality of points on the border line. From thus obtained distribution, it is recognized that the longitudinal direction corresponds to the highest peaks.

As apparent from the foregoing description, the present invention makes it possible to specify the longitudinal direction about the border line of the inspection object regardless the number of corners. Therefore, no additional step would be necessary, though the conventional method requires a step of re-setting the number of corners. Furthermore, even if the silhouette of the inspection object includes a noise such as an image of a nozzle, peaks representing the corners clearly appear on the inclination distribution. Consequently, the present invention ensures the detection of the longitudinal direction of the inspection object OB to be accurately carried out no matter what kind of noises are included.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A method of detecting a longitudinal direction of an electronic component to be mounted on a substrate, the method comprising:

a first step of taking in an image of the electronic component by a camera, and obtaining a border line of said image;

a second step of obtaining inclination angles of a plurality of vectors whose start and end points are disposed at predetermined intervals along an entire length of said border line, and obtaining a distribution of said inclination angles of said vectors;

a third step of finding a specific inclination angle having a largest frequency in said distribution, and determining a direction corresponding to said specific inclination angle as a longitudinal direction of the electronic component;

a fourth step of adjusting a direction of said electronic component by a direction adjusting device, with reference to said direction of said electronic component detected in said third step, and a fifth step of mounting said electronic component on a predetermined position of said substrate by a transporting device.

2. A method of detecting a longitudinal direction in accordance with claim 1, wherein said second step comprises setting a vector whose start and end points are positioned on said border line and setting vectors one by one by shifting said start and end points along said border line, in order to obtain the distribution of the inclination angles of said vectors.

3. A method of detecting a longitudinal direction of an electronic component to be mounted on a substrate, the method comprising:

a first step of taking in an image of the electronic component by a camera, and obtaining a border line of said image;

a second step of obtaining inclination angles of a plurality of vectors whose start and end points are disposed at predetermined intervals along an entire length of said border line, and obtaining a distribution of said inclination angles of said vectors;

a third step of finding a specific inclination angle having a largest frequency in said distribution, and determining a direction corresponding to said specific inclination angle as a longitudinal direction of the electronic component only when said largest frequency exceeds a predetermined threshold value;

a fourth step of adjusting a direction of said electronic component by a direction adjusting device, with reference to said direction of said electronic component detected in said third step, and a fifth step of mounting said electronic component on a predetermined position of said substrate by a transporting device.

4. A method of identifying a configuration of a rectangular electronic component, having a predetermined number of outwardly protruding lead terminals, to be mounted on a predetermined position of a substrate, the method comprising:

a first step of taking in an image of the electronic component and the lead terminals thereof by a camera, said lead terminals protruding outwardly from side portions of said rectangular electronic component, and obtaining a border line of said image which corresponds to a silhouette of a surface to be sucked by a suction nozzle;

a second step of obtaining inclination angles of a plurality of vectors whose start and end points are disposed at predetermined intervals along an entire length of said border line, and obtaining a distribution of inclination angles of said vectors;

a third step of detecting a plurality of candidates of lead terminals based on change of curvature of said border line;

a fourth step of finding a specific inclination angle whose frequency is largest in said distribution, and determining a direction corresponding to said specific inclination angle as a longitudinal direction of the electronic component;

a fifth step of obtaining a plurality of groups each comprising the same number of candidates of lead terminals of said electronic component, and identifying positions of actual lead terminals of said electronic component on the basis of said longitudinal direction determined in the fourth step;

a sixth step of adjusting a direction of said electronic component by a direction adjusting device, with reference to said direction of said electronic component determined in said fourth step, and a seventh step of mounting said electronic component on the predetermined position of said substrate by a transporting device.

5. A method of identifying a configuration in accordance with claim 4, wherein said second step comprises setting a vector whose start and end points are positioned on said border line and setting vectors one by one by shifting said start and end points along said border line, in order to obtain the distribution of the inclination angles of said vectors.

6. A method of identifying a configuration in accordance with claim 4, wherein said electronic component has three outwardly protruding lead terminals.

7. A method of identifying a configuration of a rectangular electronic component, having a predetermined number of outwardly protruding lead terminals, to be mounted on a predetermined position of a substrate, the method comprising:

a first step of taking in an image of the electronic component and the lead terminals thereof by a camera, said lead terminals protruding outwardly from side portions of said rectangular electronic component, and obtaining a border line of said image which corresponds to a silhouette of a surface to be sucked by a suction nozzle;

a second step of obtaining inclination angles of a plurality of vectors whose start and end points are disposed at predetermined intervals along an entire length of said border line, and obtaining a distribution of inclination angles of said vectors;

a third step of detecting a plurality of candidates of lead terminals based on a change of curvature of said border line;

a fourth step of finding a specific inclination angle whose frequency is largest in said distribution, and determining a direction corresponding to said specific inclination angle as a longitudinal direction of the electronic component only when said largest frequency exceeds a predetermined threshold value;

a fifth step of obtaining a plurality of groups each comprising the same number of candidates of lead terminals of said electronic component, and identifying positions of actual lead terminals of said electronic component on the basis of said longitudinal direction determined in the fourth step;

a sixth step of adjusting a direction of said electronic component by a direction adjusting device, with reference to said direction of said electronic component determined in said fourth step, and a seventh step of mounting said electronic component on the predetermined position of said substrate by a transporting device.

8. A method of detecting a longitudinal direction of an electronic component to be mounted on a substrate, the method comprising:

a first step of taking in an image of the electronic component by a camera, and obtaining a border line of said image, said border line being expressed by a plurality of picture elements $P_o$ to $P_k$ which are connected to form a complete contour of said image;

a second step of setting a vector $S_i$ connecting a picture element $P_i$ and a picture element $P_{i+n}$ and obtaining an inclination angle $\Theta_i$ of said vector $S_i$, and further obtaining a distribution of said inclination angle $\Theta_i$, where i=0, 1, 2, - - - , k and n is a predetermined positive integer;

a third step of finding a specific inclination angle whose frequency is largest in said distribution and determining a direction corresponding to said specific inclination angle as a longitudinal direction of the electronic component;

a fourth step of adjusting a direction of said electronic component by a direction adjusting device, with reference to said direction of said electronic component determined in said third step, and a fifth step of mounting said electronic component on a predetermined position of said substrate by a transporting device.

9. A method of identifying a configuration in accordance with claim 8, wherein said second step comprises expressing said distribution as a histogram, using a plurality of frequency memories covering 360 degrees.

10. A method of identifying a configuration of an a rectangular electronic component, having a predetermined number of outwardly protruding lead terminals, to be mounted on a predetermined position of a substrate, the method comprising:

a first step of taking in an image of the electronic component and the lead terminals thereof by a camera, said lead terminals protruding outwardly from side portions of said rectangular electronic components, and obtaining a border line of said image, which corresponds to a silhouette of a surface to be sucked by a suction nozzle, said border line being expressed by a plurality of picture elements $P_o$ to $P_k$ which are continuously connected to form a complete contour of said image;

a second step of setting a vector $S_i$ connecting a picture element $P_i$ and a picture element $P_{i+n}$, and obtaining an inclination angle $\Theta_i$ of said vector $S_i$, and further obtaining a distribution of said inclination angle $\Theta_i$, where i=0, 1, 2, - - - , k and n is a predetermined positive integer;

a third step of detecting a plurality of candidates of lead terminals from change in curvature of said border line;

a fourth step of finding a specific inclination angle whose frequency is largest in said distribution and determining a direction corresponding to said specific inclination angle as a longitudinal direction of the electronic component;

a fifth step of obtaining a plurality of groups each comprising the same number of candidates of lead terminals of said electronic component, and identifying positions of actual lead terminals of said electronic component on the basis of said longitudinal direction determined in the fourth step;

a sixth step of adjusting a direction of said electronic component by a direction adjusting device, with reference to said direction of said electronic component determined in said fourth step, and a seventh step of mounting said electronic component on the predetermined position of said substrate by a transporting device.

11. A method of identifying a configuration in accordance with claim 10, wherein said distribution is expressed in a form of a histogram, using a plurality of frequency memories covering 360 degrees.

* * * * *